J. E. MATTHEWS.
SHEARING GUIDE.
APPLICATION FILED FEB. 8, 1916.
1,195,249.
Patented Aug. 22, 1916.
2 SHEETS—SHEET 1.
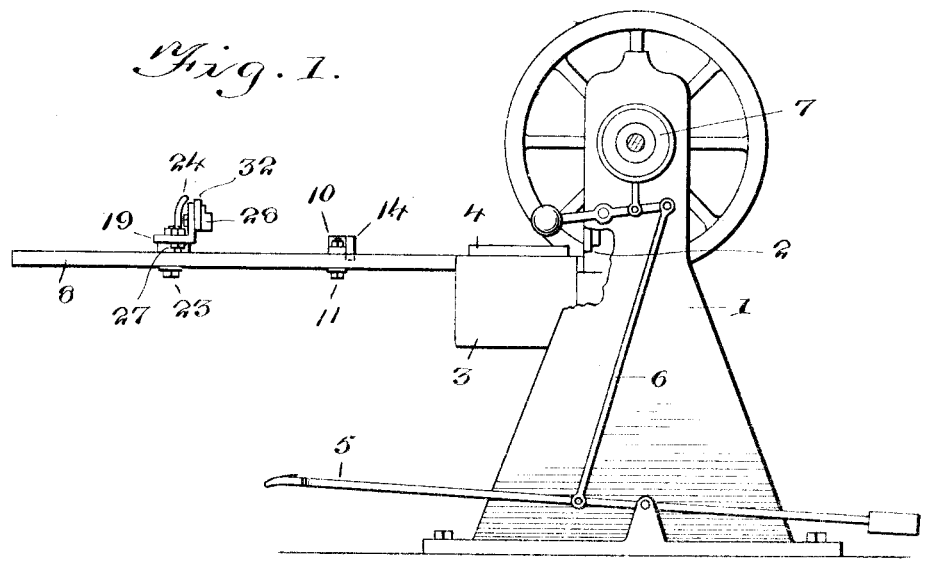
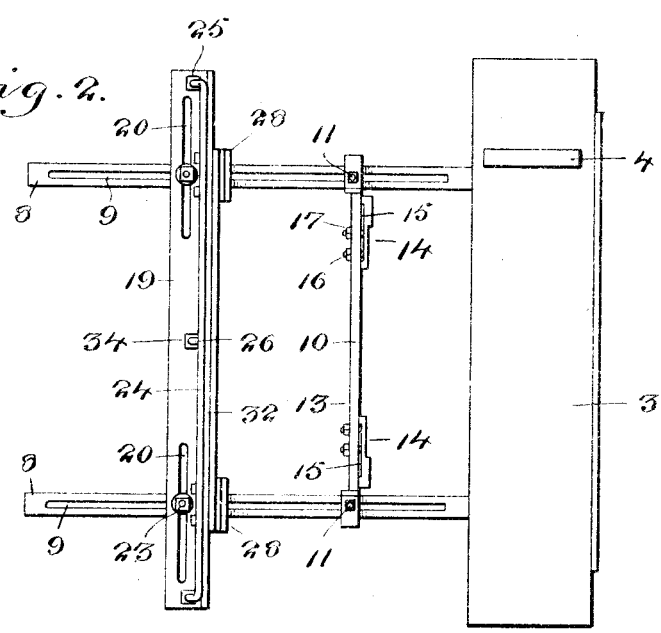

J. E. MATTHEWS.
SHEARING GUIDE.
APPLICATION FILED FEB. 8, 1916.
1,195,249.
Patented Aug. 22, 1916.
2 SHEETS—SHEET 2.
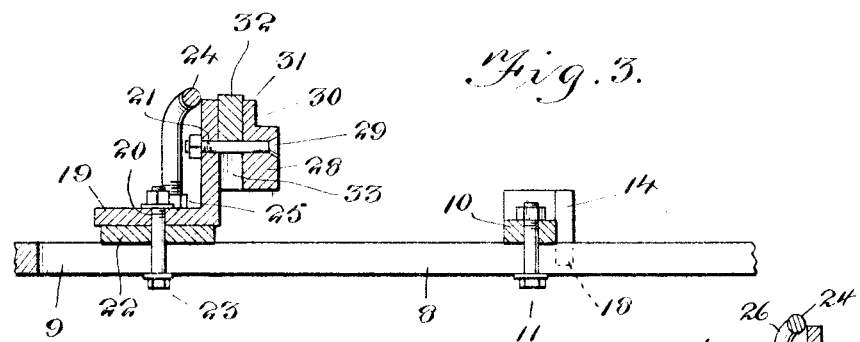
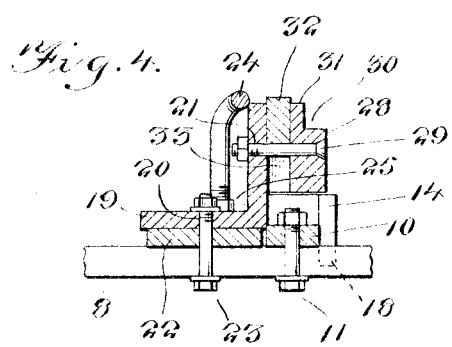
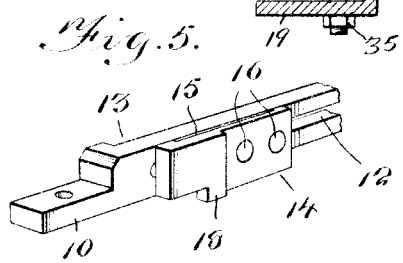
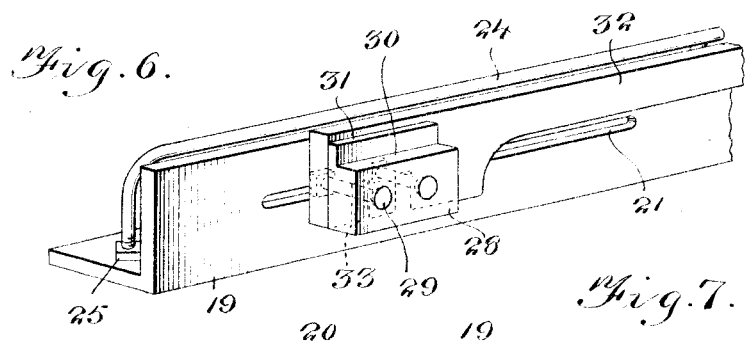
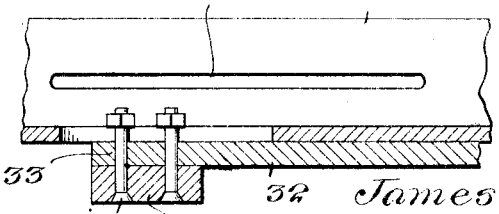
Witnesses
E. P. Ruppert
L. C. Wilcox
Inventor
James E. Matthews
By Victor J. Evans
Attorney

UNITED STATES PATENT OFFICE.

JAMES E. MATTHEWS, OF SHARON, PENNSYLVANIA.

SHEARING-GUIDE.

1,195,249.  Specification of Letters Patent.  Patented Aug. 22, 1916.

Application filed February 8, 1916. Serial No. 76,994.

*To all whom it may concern:*

Be it known that I, JAMES E. MATTHEWS, a citizen of the United States, residing at Sharon, in the county of Mercer and State of Pennsylvania, have invented new and useful Improvements in Shearing-Guides, of which the following is a specification.

This invention relates to guides especially adapted to be used upon machines for shearing tin or iron plates and it consists in the novel features hereinafter described and claimed.

An object of the invention is to provide guides of the character indicated which may be readily adjusted upon the arms of the shearing machine in order that the said guides may be spaced at desired distances from the shearing knife so that the plates may be shorn accurately without loss of time or material. The guides are provided with blocks or rests against which the edges of the plates may be positioned during the shearing operation, and thus the plates may be shorn in true rectangular configuration and the plates may be made to conform accurately to uniform or predetermined sizes or standards of measurement.

The guide includes a front member having blocks of peculiar configuration adjustably mounted upon the end portions thereof and a back member having rests adjustably mounted thereon. The said rests are provided at their upper ends with recesses, the back walls of which are spaced from the forward surfaces of the said rests. Also a guard is mounted upon the back member or guide and serves to relieve the upper portion of the member or guide from wear as the metallic sheets are moved over the said guide to position them preparatory to shearing. The said guard may be adjusted vertically so that its upper edge will be slightly above the upper edge of the rear guide or member.

An extension is provided and may be used in conjunction with the rear guide or member and the said extension may be interposed between the rests and the forward side of the rear guide or member with its upper portion projecting above the rest.

In the accompanying drawings:—Figure 1 is a side elevation of a shearing machine illustrating the shearing guides in position thereon. Fig. 2 is a top plan view of the shearing guides. Fig. 3 is a sectional view of the same showing the guides separated. Fig. 4 is a similar view showing the guides overlapping each other. Fig. 5 is a perspective view of the end portion of one of the guides. Fig. 6 is a similar view of the end portion of the other guide. Fig. 7 is a longitudinal sectional view of portions of the guide shown in Fig. 6. Fig. 8 is a detail transverse sectional view of the intermediate portion of a bar and guard used with the guide.

As illustrated in the accompanying drawing, the shearing machine 1 is of the usual pattern and is provided with a reciprocating knife 2, a table 3 and a squaring guide 4 mounted upon the said table in the vicinity of one end thereof. The machine 1 is further provided with a treadle 5 which is operatively connected by means of a rod 6 with a clutch mechanism indicated at 7 which is adapted to be operated when the free end of the treadle 5 is depressed so that the machine 1 is connected with the source of power which drives the same.

In view of the fact that the machine 1 and the features hereinbefore mentioned are such as now generally used further description of these parts is deemed unnecessary.

Spaced arms 8 extend outwardly from the table 3 and the said arms are provided with longitudinally disposed slots 9. The front shearing guide comprises a bar 10 which rests upon the upper surfaces of the arms 8 there being provided at the ends of the bar 10 bolts 11 which pass through the slots 9 of the arms 8 and which may be secured at adjusted positions along the said arms by means of nuts screwthreaded upon the upper ends of the said bolts and which bear at their faces against the upper surface of the bar 10. The bar 10 is provided in the vicinity of its ends with longitudinally disposed slots 12. The rear portion of the bar 10 between the end portions thereof is cut away forming a recess 13. The rear ends of the slots 12 open into the recess 13. Blocks 14 are adjustably mounted upon the end portions of the bar 10, the said blocks being provided at their rear sides with recesses 15. Bolts 16 pass transversely through the inner portions of the block 14 and also pass through the slots 12 and are secured at adjusted positions with relation to the bar 10 by means of nuts 17 which are screwthreaded upon the said bolts and which lie in the recess 13 provided at the back portion of the bar 10. Those portions of the blocks 14 through which the bolts 16 pass are thinner than the outer portions of the said blocks.

The blocks 14 are provided at their outer thickened portions with depending portions 18 which extend below the plane in which the upper surfaces of the arms 8 lie. The forward surfaces of the thickened portions of the blocks 14 and the forward surfaces of the depending portions 18 thereof lie in the same vertical plane and it is against the forward surfaces of the blocks 14 at the thickened portions thereof that the edge of the plate is positioned when the plate is trimmed at that edge which is parallel with its medium longitudinal dimension.

The rear guide comprises a bar 19 which is rectangular in transverse section and which is provided at its lowermost flange with longitudinally disposed slots 20 and at its upper flange with similarly disposed slots 21. The bar 19 is mounted upon washers 22 and securing bolts 23 pass through the slots 20 and the washers 22 and also through the slots 9 in the arms 8. The said bolts 23 may be secured at adjusted positions along the arms 8 by means of nuts which are screw-threaded thereon and which engage against the upper surfaces of the said bar 19 in a usual manner. A guard 24 is mounted upon the bar 19 and the said guard is provided at its ends with nuts 25 and 27. Nuts 25 bear at their lower faces against the upper surface at the lowermost flange of the bar 19. Nuts 27 bear at their upper face against the lower surface at the lowermost flange of the bar 19. The said guard 24 is provided at a point between its ends with a depending post 26, which passes through the lowermost flange of the bar 19 and which is provided with threaded nuts 34 and 35. Nut 34 bears at its lower face against the upper surface of the lowermost flange of the bar 19. Nut 35 bears at its upper face against the lower surface of the lowermost flange of the bar 19. It is apparent that by adjusting the nuts 25—27—34 and 35 the said guard 24 may be moved vertically with relation to the bar 19 so that the upper edge of the guard 24 may be positioned slightly above the upper edge of the vertical portion of the bar 19. The said guard 24 serves as means for protecting the uppermost edge of the bar 19 against wear when the metallic plates are being shifted over the guide preparatory to positioning them for the shearing operation. As the intermediate portion of the guard 24 wears the said guard may be elevated to compensate for the said wear in order that the upper portion of the guard 24 may be maintained at a desired predetermined distance above the upper edge of the vertical portion of the bar 19. Rests 28 are adjustably mounted at the end portions of the bar 19 and upon the vertical disposed portion thereof and bolts 29 pass transversely through the lower thicker portions of the said rests and the slots 21 and are secured at adjusted positions upon the bar 19 by means of nuts which are screw-threaded upon the rear ends of the said bolts in the usual manner. The rests 28 are provided at their upper forward portions with recesses 30, the rear walls 31 of which are spaced from the forward surfaces of the said rests. The upper edges of the rests 28 are approximately at the same level as the upper edge of the vertical portion of the bar 19. If desired an extension plate 32 may be interposed between the rests 28 and the forward surface of the vertically disposed portion of the bar 19 in a manner so that the upper portion of the said plate extension projects above the upper edges of the forward portion of the bar 19 and the upper edges of the said rests 28. The extension plate 32 may be provided at its lower edge with notches 33 which receive the bolts 29 inasmuch as the said notches open at the lower edge of the extension plate 32 it is apparent that the said plate may be adjusted vertically and held at an adjusted position when the nuts upon the bolts 29 are tightened. The extension plate projects slightly above the upper flange of the bar 19 to prevent the plate which is to be cut from striking the corners of the back wall 31 of the rest 28 when the operator is turning the plate around. It is optional with the operator whether the edge of the plate which is being shorn will be abutted or positioned against the lower forward portions of the rests 28 or against the walls 31. By providing these different abutting surfaces lying in different parallel planes it is apparent that plates of different sizes may be shorn without adjusting the shearing guides and also the provision of a multiplicity of different forms of shearing guides to accomplish quick and accurate shearing of plates of different sizes is avoided. By reason of the fact that the bar 19 is mounted upon the washers 22 which are one half inch thick the bar may be moved forward and overlap the bar 10 so that the said bars may be conveniently used in conjunction with each other when it is desired to alternately shear the longer and shorter edges of a sheet of metal.

In operation the sheet of metal is positioned upon the table 3 with one edge thereof under the knife 2. The operator then depresses the treadle 5 whereby the shearing machine is connected with the source of power and the knife 2 descends and removes from the sheet of metal that edge portion thereof which is under the knife. The sheet of metal is then given a quarter turn and the edge which has just been shorn is placed in position against the guide 4 and the treadle is again depressed whereby a second edge portion is removed from the sheet. This leaves the sheet with two edges exactly square. One of the said squared edges is then positioned against the forward face of the blocks 14 and the treadle is again depressed whereby the knife removes a third edge portion of the sheet which is exactly parallel with that edge portion of the sheet which is positioned against the said blocks 14. During the positioning of the sheet against the block 14 the depending portions 18 prevent the sheet from slipping between the lower sides of the said blocks and the upper surfaces of the standards 8 and thus causing delay in the shearing operation and probably damage to the sheet should the knife descend before the sheet is properly positioned with relation to the forward guide. After the third edge has been removed from the sheet it is again turned whereby the remaining unshorn edge is positioned under the knife 2 and the opposite edge of the sheet is brought into engagement with the forward surfaces of the lower portions of the rests 28 or the surfaces of the walls 31 according to the size to which it is desired to reduce the sheet. After the sheet has been placed in the final position just indicated the treadle is again depressed whereby the blade shears the fourth or remaining edge of the sheet.

From the above description taken in conjunction with the accompanying drawing it will be seen that shearing guides of simple and durable form are provided, that the same are cheap to manufacture and when in use are convenient for accurately retaining the sheets during the shearing operation.

The shearing may be performed as indicated without the use of what is generally known as double shearing guides, these being devices which require considerable time to be applied to the standards of a shearing machine and which are more expensive than the device hereinbefore described owing to the fact that they are more complicated and their use necessitates the loss of considerable time.

Having described the invention what is claimed is:—

1. Shearing guides for a shearing machine comprising front and rear bars, means for adjustably securing the bars to the machine and sheet abutments adjustably mounted upon the bars.

2. Shearing guides for a shearing machine comprising front and rear bars, means for adjustably securing the bars to the machine, sheet abutments adjustably mounted upon the said bars, the abutments upon the forward bars having depending portions which extend below the upper surfaces of the bar supporting portions of the machine.

3. Shearing guides for a shearing machine comprising arms, front and rear bars mounted thereon, means for adjustably securing the bars to the arms, sheet abutments mounted upon the rear bar, blocks mounted upon the forward bar, the said blocks being provided at their forward portions with depending parts which extend below the upper surfaces of the arms of the machine.

4. Shearing guides for a shearing machine comprising arms, front and rear bars mounted thereon, means for adjustably securing the bars to the arms, sheet abutments mounted upon the forward bar, rests adjustably mounted upon the rear bar and provided at their upper edges with recesses having rear walls parallel with the forward surfaces of the rests, a guard mounted upon the rear bar, means for adjusting the guard vertically and an extension plate adapted to be applied to the rear bar and secured between the rests and the forward surface of the said rear bar.

In testimony whereof I affix my signature in presence of two witnesses.

JAMES E. MATTHEWS.

Witnesses:
R. B. BUTLER,
S. FREYMAN.